(12) United States Patent
Jo (10) Patent No.: US 9,894,300 B2
(45) Date of Patent: Feb. 13, 2018

(54) IMAGE SENSING DEVICE FOR MEASURING TEMPERATURE WITHOUT TEMPERATURE SENSOR AND METHOD FOR DRIVING THE SAME

(71) Applicant: SK hynix Inc., Gyeonggi-do (KR)

(72) Inventor: Min-Hee Jo, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 251 days.

(21) Appl. No.: 14/812,802

(22) Filed: Jul. 29, 2015

(65) Prior Publication Data
US 2016/0277691 A1 Sep. 22, 2016

(30) Foreign Application Priority Data
Mar. 19, 2015 (KR) .................. 10-2015-0038165

(51) Int. Cl.
*H04N 5/361* (2011.01)
*H04N 5/365* (2011.01)

(52) U.S. Cl.
CPC ............. *H04N 5/361* (2013.01); *H04N 5/365* (2013.01)

(58) Field of Classification Search
CPC ...... H04N 5/361; H04N 5/365; H04N 5/3698; H04N 5/378; H04N 5/3658; H04N 5/357; H04N 9/045; H04N 1/00814; H04N 1/4005; H04N 1/6091
See application file for complete search history.

(56) References Cited

U.S. PATENT DOCUMENTS

| 7,787,033 B2* | 8/2010 | Rossi | H04N 5/361 257/467 |
| 8,675,101 B1* | 3/2014 | Linzer | H04N 5/361 348/241 |
| 2005/0276496 A1* | 12/2005 | Molgaard | H04N 19/105 382/244 |
| 2009/0026571 A1* | 1/2009 | Inagaki | H01L 27/14603 257/467 |
| 2009/0213211 A1* | 8/2009 | Bayer | A61B 1/00181 348/65 |
| 2012/0035419 A1* | 2/2012 | Ashida | A61B 1/00009 600/109 |
| 2012/0194718 A1* | 8/2012 | Sato | H04N 5/357 348/301 |

FOREIGN PATENT DOCUMENTS

KR 1020060035391 4/2006

* cited by examiner

*Primary Examiner* — Que T Le
*Assistant Examiner* — Jennifer Bennett
(74) *Attorney, Agent, or Firm* — IP & T Group LLP (57) ABSTRACT

An image sensing device may include a temperature estimation block suitable for generating a temperature code signal based on a temperature table in response to a digital code signal corresponding to a pixel signal, and a calibration block suitable for removing noise reflected in the pixel signal at current temperature in response to the temperature code signal.

17 Claims, 5 Drawing Sheets

IMAGE SENSING DEVICE FOR MEASURING TEMPERATURE WITHOUT TEMPERATURE SENSOR AND METHOD FOR DRIVING THE SAME

CROSS-REFERENCE TO RELATED APPLICATIONS

The present application claims priority of Korean Patent Application No. 10-2015-0038165, filed on Mar. 19, 2015, which is incorporated herein by reference in its entirety.

BACKGROUND

1. Field

Exemplary embodiments of the present invention relate to a semiconductor design technology and, more particularly, to an image sensing device and a method for driving the same.

2. Description of the Related Art

Image sensing devices capture images using photosensitive properties of semiconductors. Image sensing devices can be divided into charge-coupled device (CCD) image sensors and complementary metal oxide semiconductor device (CMOS) image sensors. Image sensing devices using CMOS technology are used frequently because they offer the advantage being able to directly implement their analog and digital control circuits on one integrate circuit (IC).

However, image sensing devices have a problem where their temporal noise increases with temperature. For example, image sensing devices may have fixed pattern noise (FPN) that increases with temperature.

Therefore, a technology capable of removing temporal noise according to temperature would be beneficial.

SUMMARY

Various embodiments are directed to an image sensing device capable of measuring temperature and a method for driving the same.

Also, various embodiments are directed to an image sensing device capable of indirectly measuring temperature without a temperature sensor, and a method for driving the same.

In an embodiment, an image sensing device may include a temperature estimation block suitable for generating a temperature code signal based on a temperature table in response to a digital code signal corresponding to a pixel signal, and a calibration block suitable for removing noise reflected in the pixel signal at current temperature in response to the temperature code signal.

The pixel signal may be outputted from an optical black pixel.

The temperature estimation block may generate the temperature code signal during an initial operation period of a normal operation mode.

The temperature estimation block may include a storage unit suitable for storing the temperature code signal, wherein the temperature estimation block may generate the temperature code signal during a blank period existing between readout periods of the normal operation mode, and updates the storage unit with the generated temperature code signal.

In an embodiment, an image sensing device may include a pixel array block including a plurality of pixels for generating a plurality of analog pixel signals, a signal conversion block suitable for converting a plurality of analog pixel signals into a plurality of digital pixel signals, a first code processing block suitable for generating one or more critical code signals reflecting one or more pieces of temperature information in response to the plurality of digital pixel signals during a first operation mode, and generating a target code signal reflecting current temperature information in response to the plurality of digital pixel signals during a second operation mode, a second code processing block suitable for generating a temperature table containing a reference code signal for temperature based on the critical code signal, a temperature estimation block suitable for estimating current temperature corresponding to the target code signal based on the temperature table, and a calibration block suitable for removing noise reflected in the analog pixels signals or the digital pixel signals at the current temperature based on an estimation result of the temperature estimation block.

The plurality of pixels may include active pixels and optical black pixels.

The first code processing block may include an extraction unit suitable for extracting digital pixel signals corresponding to the optical black pixels among the plurality of digital pixel signals during the first and second operation modes, and an average calculation unit suitable for calculating an average of extracted pixel signals outputted from the extraction unit and generating the critical code signal and the target code signal corresponding to the average of the extracted pixel signals during the first and second operation modes, respectively.

The second code processing block may include a first storage unit suitable for storing the critical code signal, a temperature table generation unit suitable for generating the temperature table based on the critical code signal stored in the first storage unit, and a second storage unit suitable for storing the temperature table.

The temperature estimation block may generate a temperature code signal corresponding to the current temperature and output the generated temperature code signal to the calibration block, during an initial operation period and a blank period between readout periods of the second operation mode.

The temperature estimation block may include a third storage unit suitable for storing the temperature code signal, wherein the temperature estimation block may update the temperature code signal in the third storage unit at each blank period.

The pixel array block may generate the analog pixel signals under the same first readout conditions during the first and second operation modes, and the signal conversion block may generate the digital pixel signals under the same second readout conditions during the first and second operation modes.

The first readout conditions may include an exposure time condition.

The second readout conditions may include a gain condition.

In an embodiment, a method for driving an image sensing device may include generating a digital pixel signal corresponding to an analog pixel signal based on a predetermined temperature condition and a predetermined readout conditions, and generating a temperature table containing a reference code signal for temperature based on the digital pixel signal, during a test mode, generating the digital pixel signal corresponding to the analog pixel signal based on the readout conditions, and estimating current temperature based on the digital pixel signal and the temperature table, during a normal operation mode, and removing noise reflected in the analog pixel signal or the digital pixel signal based on the estimated current temperature, during the normal operation mode.

The generating of the digital pixel signal and the temperature table may include generating a first digital pixel signal based on the readout conditions at a first temperature, generating a first critical code signal in response to the first digital pixel signal generated at the first temperature, generating a second digital pixel signal based on the readout conditions at a second temperature different from the first temperature, generating the second critical code signal in response to the second digital pixel signal generated at the second temperature, and generating the temperature table based on the first critical code signal and the second critical code signal.

The generating of the digital pixel signal and the estimating of the current temperature may include generating a third digital pixel signal based on the readout conditions at the current temperature, generating a target code signal in response to the third digital pixel signal generated at the current temperature, and estimating the current temperature corresponding to the target code signal based on the temperature table.

The removing of the noise may include controlling a current source coupled to an output terminal of the analog pixel signal.

The removing of the noise may include controlling a current source coupled to an output terminal of the digital pixel signal.

The readout conditions may include an exposure time condition and a gain condition.

The normal operation mode may include a period in which the image sensing device performs a stable operation, and the normal operation mode may include a pre-normal period, a readout period, and a blank period.

The estimating of the current temperature and the removing of the noise may be performed during the pre-normal period and the blank period.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1:
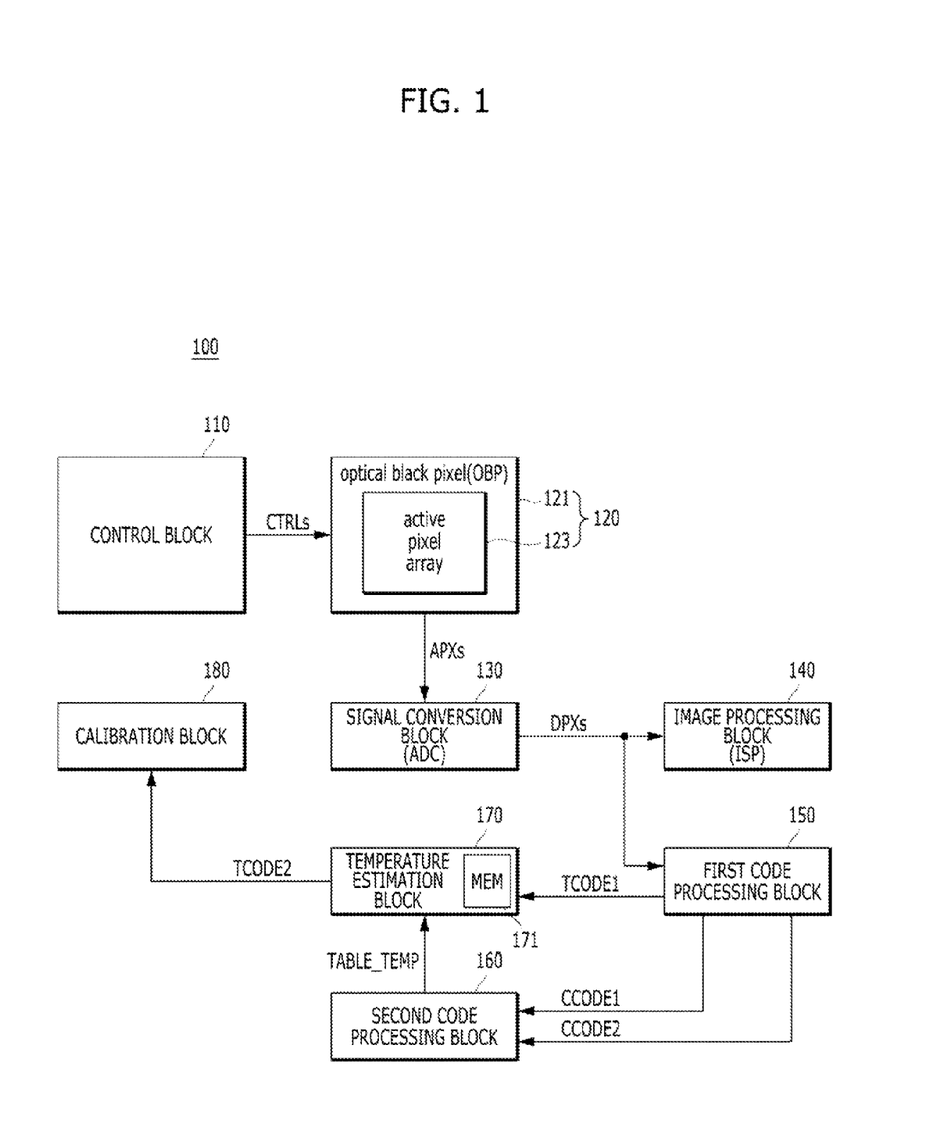
FIG. 1 is a block diagram illustrating an image sensing device in accordance with a first embodiment of the present invention.

FIG. 1 is a block diagram illustrating an image sensing device in accordance with a first embodiment of the present invention.

Referring to FIG. 1, the image sensing device 100 may include a control block 110, a pixel array block 120, a signal conversion block 130, an image processing block 140, a first code processing block 150, a second code processing block 160, a temperature estimation block 170, and a calibration block 180.

The control block 110 may generate operation control signals CTRLs for controlling the operation of the pixel array block 120. For example, the operation control signals CTRLs may include a transmit signal TX, a reset signal RX, and a select signal SX. For reference, the transmit signal TX, the reset signal RX, and the select signal SX are described as a single signal. However, the transmit signal TX, the reset signal RX, and the select signal SX may be generated for each row of the pixel array block 120. The functions of these signals TX, RX, and SX will be described below in detail (refer to FIG. 2).

In particular, the control block 110 may generate operation control signals CTRLs based on a first readout condition during a test operation mode, and during only a predetermined period of a normal operation mode. In other words, the control block 110 may generate the operation control signals CTRLs based on the same first readout condition during the test operation mode and the predetermined period of the normal operation mode. For example, the first readout condition may include an exposure time condition. In the following descriptions, the first readout condition will be referred to as the exposure time condition.

For reference, the test operation mode may include a wafer-level test operation mode for testing the image sensing device 100 before being modularized and a package-level test operation mode for testing the image sensing device 100 after being modularized.

The pixel array block 120 may include a first pixel area 121 having optical black pixels OBP and a second pixel area 123 having active pixels. The first pixel area 121 may be formed at the edge of the pixel array block 120, and the second pixel area 123 may be formed in the center of the pixel array block 120. The optical black pixels and the active pixels may be arranged in rows and columns. The optical black pixels and the active pixels may generate a plurality of analog pixel signals APXs on a row basis in response to the plurality of operation control signals CTRLs. The optical black pixels and the active pixels may have the same circuit configuration. However, light is blocked from the optical black pixels, unlike the active pixels.

For reference, an optical black pixel can output an analog pixel signal corresponding to a dark current because light is blocked. Typically, the analog pixel signal corresponding to the dark current may be used to compensate for an offset value of an active pixel. Dark current is proportional to the square root of temperature, as expressed by Equation 1 below.

$$D^2 = kTC \quad \text{[Equation 1]}$$

Here, "D" represents a dark current, and "k" represents the Boltzmann constant, and "T" represents a temperature, and "C" represents a capacitance of a photodiode PD to be described below.

In other words, the dark current depends on temperature. When the temperature is varied, the dark current also varies.

Therefore, when the dark current can be measured, the current temperature may be indirectly measured.

During the test operation mode, the pixel array block 120 may generate a plurality of analog pixel signals APXs on different temperature conditions but on identical exposure time conditions. For example, during the test operation mode, the pixel array block 120 can generate a plurality of analog pixel signals APXs corresponding to a predetermined exposure time at room temperature, and then generate a plurality of analog pixel signals APXs corresponding to the predetermined exposure time at high temperature. Furthermore, during the predetermined period of the normal operation mode, the pixel array block 120 may generate a plurality of analog pixel signals APXs corresponding to the predetermined exposure time at current temperature.

The signal conversion block 130 may convert the plurality of analog pixel signals APXs into a plurality of digital pixel signals DPXs. For example, the signal conversion block 130 may detect the voltage levels of the plurality of analog pixel signals APXs based on a ramp voltage (not illustrated), and generate the plurality of digital pixel signals DPXs based on the detection result. The signal conversion block 130 may include an analog-to-digital converter (ADC).

In particular, the signal conversion block 130 may generate a plurality of digital pixel signals DPXs based on a second readout condition during the test operation mode, and during the predetermined period of the normal operation mode. In other words, the signal conversion block 130 may generate the plurality of digital pixel signals DPXs based on the same second readout condition during the test operation mode and the predetermined period of the normal operation mode. For example, the second readout condition may include a gain condition. In the following descriptions, the second readout condition will be referred to as the gain condition.

The image processing block 140 may generate image data (not illustrated) in response to the plurality of pixel signals DPXs. For example, the image processing block 140 may generate the image data by correcting colors or removing noise in response to the plurality of digital pixel signals DPXs. The image processing block 140 may include an image signal processor (ISP). In the present specification, the detailed descriptions of the image processing block 140 are omitted, in order to clarify the scope of the present invention.

The first code processing block 150 may generate a first critical code signal CCODE1 reflecting first temperature information and second critical code signal CCODE2 reflecting second temperature information in response to the plurality of digital pixel signals DPXs during the test operation mode, and generate a target code signal TCODE1 reflecting current temperature information in response to the plurality of digital pixel signals DPXs during the normal operation mode. For example, the first code processing block 150 may generate the first critical code signal CCODE1 corresponding to the dark current at room temperature in response to the plurality of digital pixel signals DPXs outputted from the signal conversion block 130 under the room temperature condition during the test operation mode. Furthermore, the first code processing block 150 may generate the second critical code signal CCODE2 corresponding to the dark current at high temperature in response to the plurality of digital pixel signals DPXs outputted from the signal conversion block 130 under the high temperature condition during the test operation mode. Furthermore, the first code processing block 150 may generate the target code signal TCODE1 corresponding to the dark current at current temperature in response to the plurality of digital pixel signals DPXs outputted from the signal conversion block 130 under the current temperature condition during the predetermined condition of the normal operation mode.

The second code processing block 150 may generate a temperature table TABLE_TEMP containing reference code signals for temperature, based on the first and second critical code signals CCODE1 and CCODE2, during the test operation mode. For example, the second code processing block 160 may generate a temperature table TABLE_TEMP containing a plurality of reference code signals for a plurality of temperature values between the room temperature and the high temperature, based on the first and second critical code signals CCODE1 and CCODE2.

The temperature estimation block 170 may estimate the current temperature corresponding to the target code signal TCODE1 based on the temperature table TABLE_TEMP during the predetermined period of the normal operation mode. For example, the temperature estimation block 170 may compare the plurality of reference code signals contained in the temperature table TABLE_TEMP to the target code signal TCODE1, detect a reference code signal corresponding to the target code signal TCODE1 among the plurality of reference code signals as the comparison result, and estimate a temperature value corresponding to the detected reference code signal as the current temperature. Furthermore, the temperature estimation block 170 may generate a temperature code signal TCODE2 corresponding to the current temperature. The temperature estimation block 170 may include a third storage unit 171 for storing the temperature code signal TCODE2. For example, the third storage unit 171 may include a register.

The normal operation mode may follow a standby mode in which the image sensing device 100 may perform a reset operation or the like, and the image sensing device 100 may stably operate in the normal operation mode. The normal operation mode may include a pre-normal period, a plurality of readout periods, and a plurality of blank periods. The pre-normal period is the initial operation period of the normal operation mode, and may be separately allocated ahead of a period for an actual normal operation. During the plurality of readout periods, the actual normal operation may be performed. For example, during each of the readout periods, image data corresponding to each frame may be generated. The plurality of blank periods may exist between the respective readout periods. The predetermined period of the normal operation mode may include the pre-normal period and the plurality of blank periods.

The temperature estimation block 170 may generate the temperature code signal TCODE2 and store the temperature code signal TCODE2 in the third storage unit 171, during the pre-normal period among the periods included in the normal operation mode. The temperature estimation block 170 may generate the temperature code signal TCODE2 and update the third storage unit 171, during the plurality of blank periods among the periods included in the normal operation mode.

The calibration block 180 may remove noise reflected in the plurality of analog pixel signals APXs or the plurality of digital pixel signals DPXs, in response to the temperature code signal TCODE2. For example, the calibration block 180 may control current sources which are directly or indirectly coupled to output terminals of the plurality of analog pixel signals APXs in response to the temperature code signal TCODE2, and thus remove the noise reflected in the plurality of analog pixel signals APXs. This process will be described below with reference to FIG. 2. Furthermore, the calibration block 180 may control current sources which are directly or indirectly coupled to output terminals of the plurality of digital pixel signals DPXs in response to the temperature code signal TCODE2, and thus remove the noise reflected in the plurality of digital pixel signals DPXs. For example, although not illustrated, the signal conversion block 130 may include an amplifier for comparing the ramp voltage to the plurality of analog pixel signals APXs, and the calibration block 180 may remove the noise reflected in the plurality of digital pixel signals DPXs by controlling a current source included in the amplifier.

The calibration block 180 may directly control the current sources, or indirectly control the current sources through the image processing block 140. When the image processing block 140 is used, the image processing block 140 needs to be designed to control the current sources.

Figure 2:
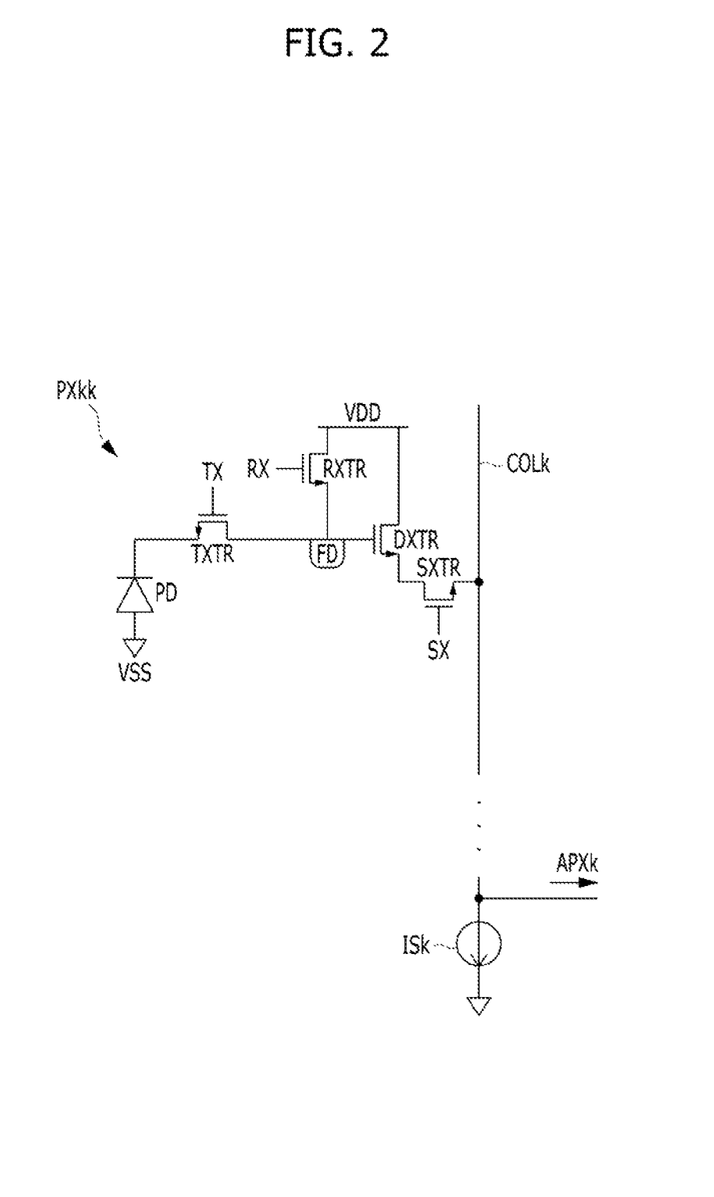
FIG. 2 is an internal configuration diagram illustrating a part of a pixel array block of FIG. 1.

FIG. 2 is an internal configuration diagram illustrating a part of the pixel array block 120 of FIG. 1. That is, FIG. 2 representatively illustrates any one pixel PXkk included in the pixel array block 120, any one column line COLk coupled to the pixel PXkk, and any one current source ISk coupled to the column line COLk.

Referring to FIG. 2, the pixel array block 120 may include the pixel PXkk, the column line COLk, and the current source ISk.

The pixel PXkk may have a 4-transistor structure. The pixel PXkk may include a photodiode PD, a reset transistor RXTR, a transmit transistor TXTR, a driving transistor DXTR, and a select transistor SXTR. The photodiode PD may generate a photocharge in response to incident light. The reset transistor RXTR may drive a floating diffusion node FD to a predetermined voltage (for example, VDD) in response to the reset signal RX. The transmit transistor TXTR may transmit the photocharge generated through the photodiode PD to the floating diffusion node FD in response to the transmit signal TX. The driving transistor DXTR may drive the column line COLk in response to the voltage of the floating diffusion node FD. The select transistor SXTR may couple the driving transistor DXTR and the corresponding column line COLk in response to the select signal SX.

The column line COLk may transmit an analog pixel signal APXk outputted from the pixel PXkk to the signal conversion block 130.

The current source ISk may adjust the amount of current flowing through the column line COLk. In the embodiment of the present invention, the current source ISk may be controlled directly or indirectly by the calibration block 180. For example, under the control of the calibration block 180, the current source ISk may increase the amount of current flowing through the column line COLk when the current temperature is high. On the other hand, under the control of the calibration block 180, the current source ISk may decrease the amount of current flowing through the column line COLk when the current temperature is low.

Figure 3:
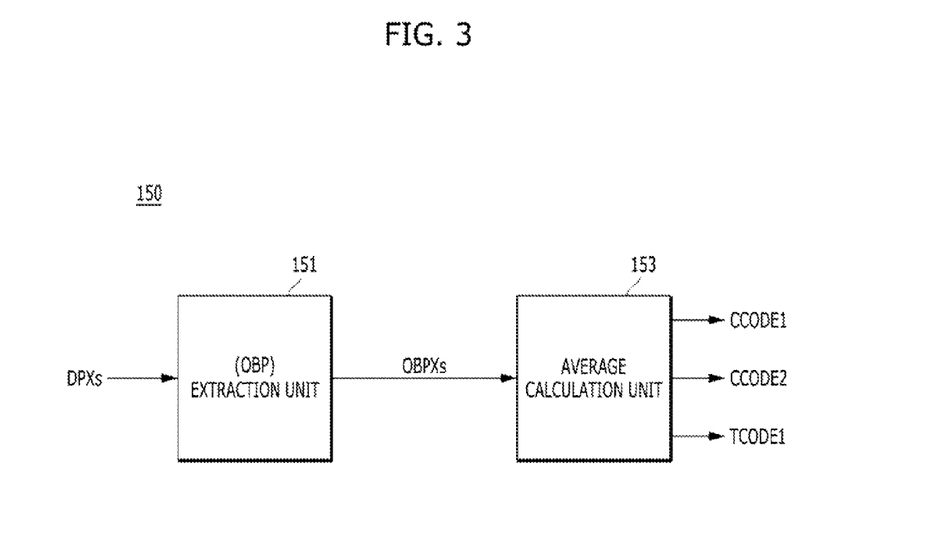
FIG. 3 is a block configuration diagram illustrating a first code processing block of FIG. 1.

FIG. 3 is a block configuration diagram illustrating the first code processing block 150 of FIG. 1.

Referring to FIG. 3, the first code processing block 150 may include an extraction unit 151 and an average calculation unit 153.

The extraction unit 151 may be enabled during the test operation mode, and enabled during the predetermined period of the normal operation mode. The extraction unit 151 may extract digital pixel signals corresponding to optical black pixels included in the first pixel area 121 among the plurality of digital pixel signals DPXs, and output the extracted digital pixel signals as extracted pixel signals OBPXs. For example, the extraction unit 151 may extract digital pixel signals corresponding to a part or all of the optical black pixels among the plurality of digital pixel signals DPXs. Furthermore, the extraction unit 151 may extract the digital pixel signals corresponding to the optical black pixels for some or all rows.

The average calculation unit 153 may be enabled during the test operation mode, and enabled during the predetermined period of the normal operation mode. The average calculation unit 153 may generate the first or second critical code signal CCODE1 or CCODE2 corresponding to the average of the extracted pixel signals OBPXs during the test operation mode. For example, during the test operation mode, the average calculation unit 153 may calculate the average of the extracted pixel signals OBPXs at room temperature, and generate the first critical code signal CCODE1 corresponding to the calculation result. Also, the average calculation unit 153 may calculate the average of the extracted pixel signals OBPXs at high temperature, and generate the second critical code signal CCODE2 corresponding to the calculation result. The average calculation unit 153 may generate the target code signal TCODE1 corresponding to the average of the extracted pixel signals OBPXs during the predetermined period of the normal operation mode. For example, the average calculation unit 153 may calculate the average of the extracted pixel signals OBPXs at the current temperature during the predetermined period, and generate the target code signal TCODE1 corresponding to the calculation result.

For example, the average calculation unit 153 may convert the binary-code extracted pixel signals OBPXs into decimal codes, respectively, calculate the average of the decimal codes, and generate the first critical code signal CCODE1, the second critical code signal CCODE2, or the target code signal TCODE1, which has a binary code, based on the average of the decimal codes.

Figure 4:
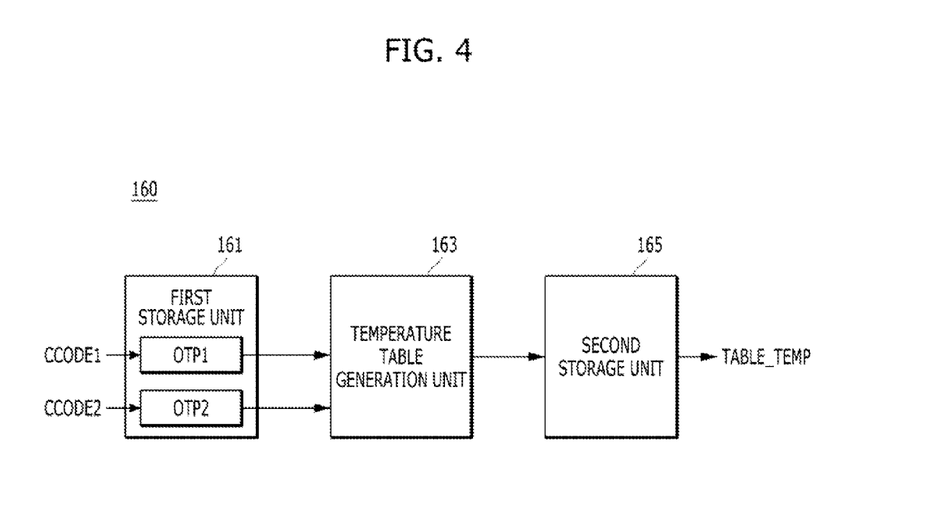
FIG. 4 is a block configuration diagram illustrating a second code processing block of FIG. 1.

FIG. 4 is a block configuration diagram illustrating the second code processing block 160 of FIG. 1.

Referring to FIG. 4, the second code processing block 160 may include a first storage unit 161, a temperature table generation unit 163, and a second storage unit 165.

The first storage unit 161 may store the first critical code signal CCODE1 and the second critical code signal CCODE2. For example, the first storage unit 161 may include a one time programmable (OTP) circuit.

The temperature table generation unit 163 may generate a temperature table TABLE_TEMP containing reference code signals for temperature, based on the first and second critical code signals CCODE1 and CCODE2 stored in the first storage unit 161.

The second storage unit 165 may store the temperature table TABLE_TEMP. For example, the second storage unit 165 may include the OTP circuit.

Hereafter, a method for driving the image sensing device having the above-described configuration will be described with reference to FIGS. 5 to 7.

Figure 5:
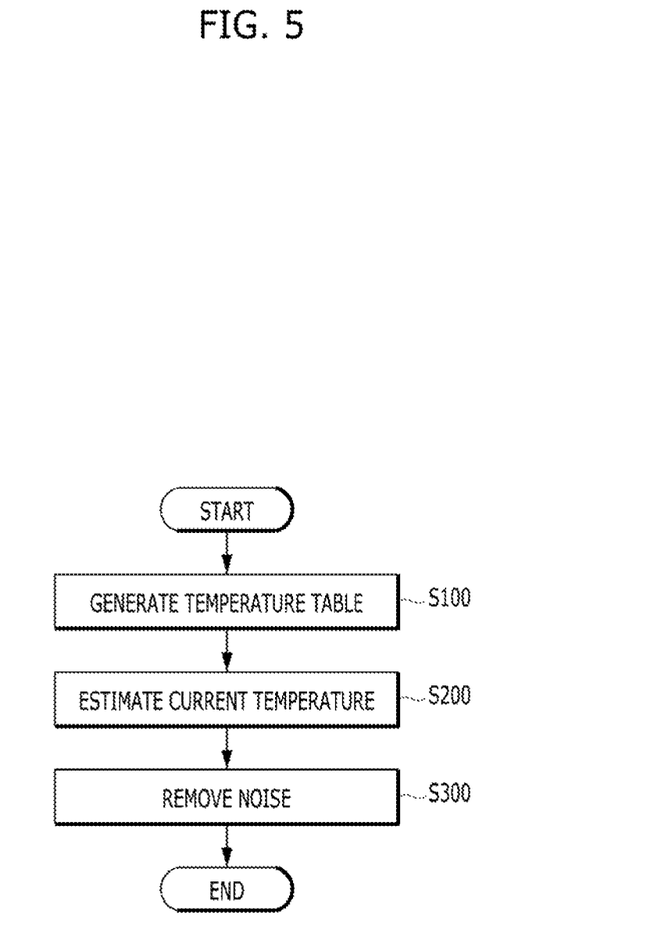
FIG. 5 is a flowchart for describing a method for driving an image sensing device in accordance with an embodiment of the present invention.

FIG. 5 is a flowchart for describing a method for driving the image sensing device 100 in accordance with an embodiment of the present invention.

Referring to FIG. 5, the method for driving the image sensing device 100 may include generating a temperature table TABLE_TEMP at step S100, estimating current temperature based on the temperature table TABLE_TEMP at step S200, and removing noise based on the current temperature at step S300.

The generating of the temperature table TABLE_TEMP at step S100 may be performed in a test operation mode, and the estimating of the current temperature at step S200 and the removing of noise at step S300 may be performed in a normal operation mode.

Figure 6:
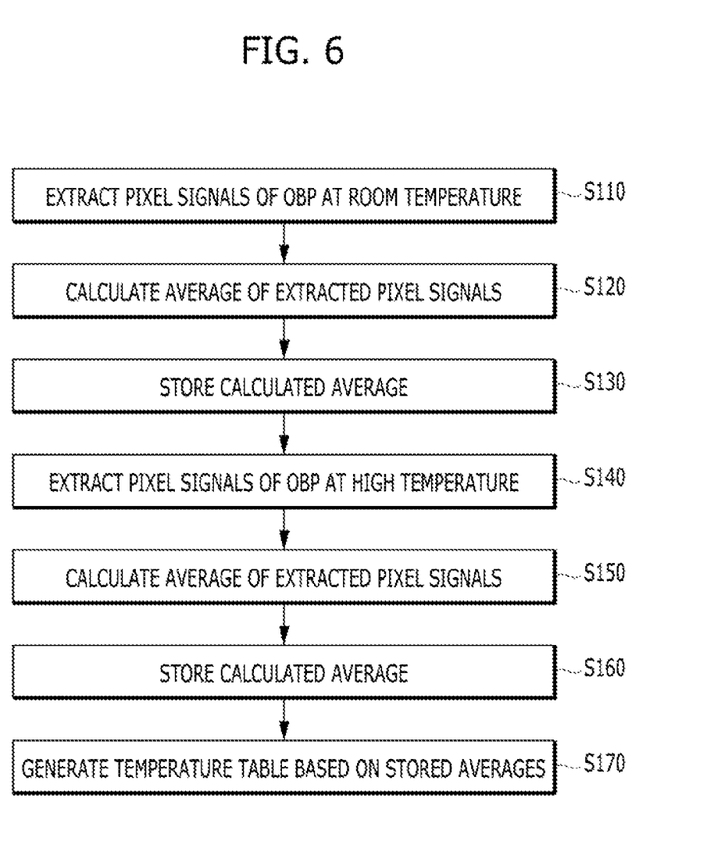
FIG. 6 is a flowchart for describing a step of generating a temperature table in FIG. 5 in more detail.

FIG. 6 is a flowchart for describing the generating of the temperature table TABLE_TEMP at step S100 in FIG. 5 in more detail.

Referring to FIG. 6, the generating of the temperature table TABLE_TEMP at step S100 may include a first step S110, S120, and S130 of acquiring analog pixel signals outputted from optical black pixels at a room temperature condition, a second step S140, S150, and S160 of acquiring the analog pixel signals outputted from the optical black pixels at a high temperature condition, and a third step S170 of generating the temperature table TABLE_TEMP based on the analog pixel signals acquired at the room temperature condition and the analog pixel signals acquired at the high temperature condition.

The first step S110, S120, and S130 will be described in more detail as follows. The control block 110 may generate operation control signals CTRLs based on a predetermined exposure time condition. Then, the pixel array block 120 may generate a plurality of analog pixel signals APXs corresponding to the exposure time condition in response to the operation control signal CTRLs. At this time, the pixel array block 120 may generate a plurality of analog pixel signals APXs for one frame. The signal conversion block 130 may generate a plurality of digital pixel signals DPXs corresponding to the plurality of analog pixel signals APXs based on a predetermined gain condition. The extraction unit 151 may extract digital pixel signals corresponding to optical black pixels among the plurality of digital pixel signals DPXs, and generate extracted pixel signals OBPXs, at step S110. Then, the average calculation unit 153 may calculate the average of the extracted pixel signals OBPXs and generate a first critical code signal CCODE1 at step S120. At this time, the first critical code signal CCODE1 may include temperature information corresponding to room temperature. The first storage unit 161 may store the first critical code signal CCODE1 at step S130.

The second step S140, S150, and S160 will be described in more detail as follows. The control block 110 may generate operation control signals CTRLs based on the same exposure time condition as the first step S110, S120, and S130. The pixel array block 120 may generate a plurality of analog pixel signals APXs corresponding to the exposure time condition in response to the operation control signal CTRLs. At this time, the pixel array block 120 may generate a plurality of analog pixel signals APXs for one frame. The signal conversion block 130 may generate a plurality of digital pixel signals DPXs corresponding to the plurality of analog pixel signals APXs based on the same gain condition as the first step S110, S120, and S130. The extraction unit 151 may extract digital pixel signals corresponding to the optical black pixels among the plurality of digital pixel signals DP s, and generate extracted pixel signals OBPXs, at step S140. The average calculation unit 153 may calculate the average of the extracted pixel signals OBPXs and generate a second critical code signal CCODE2, at step S150. The second critical code signal CCODE2 may include temperature information corresponding to high temperature. Then, the first storage unit 161 may store the second critical code signal CCODE2 at step S160.

The third step S170 will be described in more detail as follows. The temperature table generation unit 163 may generate a temperature table TABLE_TEMP containing reference code signals for temperature, based on the first and second critical code signals CCODE1 and CCODE2. For example, the temperature table generation unit 163 may generate a temperature table TABLE_TEMP containing a plurality of reference code signals for a plurality of temperature values between the room temperature and the high temperature, based on the first second critical code signal CCODE1 at the room temperature and the second critical code signal CCODE2 at the high temperature. The second storage unit 165 may store the temperature table TABLE_TEMP.

Figure 7:
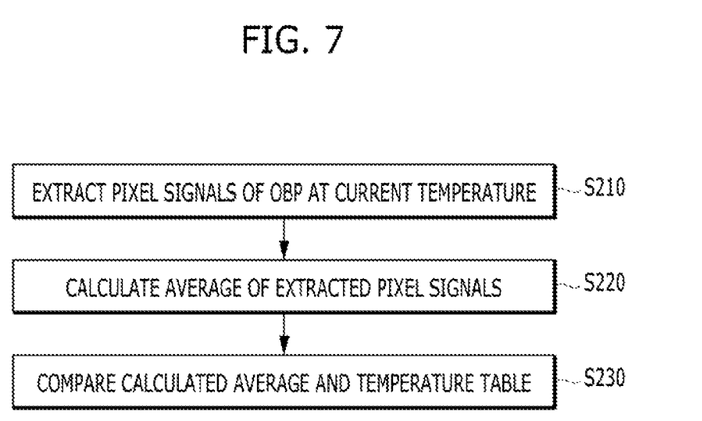
FIG. 7 is a flowchart for describing a step of estimating current temperature in FIG. 5 in more detail.

FIG. 7 is a flowchart for describing the estimating of the current temperature at step S200 in FIG. 5 in more detail.

Referring to FIG. 7, the estimating of the current temperature at step S200 may include a fourth step S210 of acquiring analog pixel signals outputted from the optical black pixels at the current temperature condition, a fifth step S220 of calculating the average of the analog pixel signals acquired at the fourth step S210, and a sixth step S230 of estimating the current temperature based on the average calculated at the fifth step S220.

The fourth step S210 will be described in more detail as follows. The control block 110 may generate operation control signals CTRLs based on the same exposure time condition as the first step S110, S120, and S130. The pixel array block 120 may generate a plurality of analog pixel signals APXs corresponding to the exposure time condition in response to the operation control signals CTRLs. At this time, the pixel array block 120 may generate a plurality of analog pixel signals APXs for one frame. The signal conversion block 130 may generate a plurality of digital pixel signals DPXs corresponding to the plurality of analog pixel signals APXs based on the same gain condition as the first step S110, S120 and S130. The extraction unit 151 may extract digital pixel signals corresponding to the optical black pixels among the plurality of digital pixel signals DPXs, and generate extracted pixel signals OBPXs.

The fifth step S220 will be described in more detail as follows. The average calculation unit 153 may calculate the average of the extracted pixel signals OBPXs generated at the fourth step S210, and generate a target code signal TCODE1. The target code signal TCODE1 may include temperature information corresponding to the current temperature.

The sixth step S230 will be described in more detail as follows. The temperature estimation block 170 may compare the target code signal TCODE1 to reference code signals for temperature, contained in the temperature table TABLE_TEMP, detect a reference code signal corresponding to the target code signal TCODE1, and estimate the temperature corresponding to the detected reference code signal as current temperature. The temperature estimation block 170 may store a temperature code signal TCODE2 corresponding to the estimated current temperature in the third storage unit 171.

The removing of the noise at step S300 will be described as follows. The calibration block 180 may remove noise reflected in the plurality of analog pixel signals APXs and the plurality of digital pixel signals DPXs, in response to the temperature code signal TCODE2. For example, the calibration block 180 may control the current source ISk included in the pixel array block 120 in response to the temperature code signal TCODE2, and remove the noise reflected in the plurality of analog pixel signals APXs. For example, the calibration block 180 may control the current source ISk to generate more current as the estimated current temperature increases. On the other hand, the calibration block 180 may control the current source ISk to generate less current as the estimated current temperature decreases. Furthermore, the calibration block 180 may control a current source (not illustrated) included in the signal conversion block ADC in response to the temperature code signal TCODE2, and remove the noise reflected in the plurality of digital pixel signals DPXs.

The estimating of the current temperature at step S200 and the removing of the noise at step S300 may be performed in the normal operation mode following a standby mode in which a reset operation or the like is performed. In particular, the estimating of the current temperature at step S200 and the removing of the noise at step S300 may be performed at the pre-normal period corresponding to the initial operation period among the periods included in the normal operation mode. The estimating of the current temperature at step S200 and the removing of the noise at step S300 may be performed at blank periods among the periods included in the normal operation mode. The pre-normal period and the plurality of blank periods may correspond to periods obtained by excluding actual normal operation periods of the image sensing device 100 among the periods included in the normal operation mode, that is, the readout periods.

In accordance with an embodiment of the present invention, the image sensing device can indirectly measure temperature, and calibrate analog pixel signals or/and digital pixel signals based on the measured temperature, thereby removing fixed pattern noise (FPN).

Since the image sensing device can adaptively remove noise which varies with temperature, the reliability of the image sensing device can be improved.

Furthermore, since the image sensing device can indirectly measure temperature without a temperature sensor, the area of the image sensing device can be reduced.

Although various embodiments have been described for illustrative purposes, it will be apparent to those skilled in the art that various changes and modifications may be made without departing from the spirit and scope of the invention as defined in the following claims.

In the embodiment of the present invention, it has been described that noise reflected in pixel signals is removed based on current temperature. However, the present invention is not limited thereto, but can be applied to a circuit or device which requires calibration based on temperature.

Furthermore, in the embodiment of the present invention, it has been described that the temperature table is generated in the range of room temperature and high temperature. However, the present invention is not limited thereto, and the temperature table can be generated in a different temperature range (for example, a temperature range of low temperature and room temperature or a temperature range of low temperature and high temperature).

Furthermore, in an embodiment of the present invention, it has been described that the temperature table is generated based on two critical code signals. However, the present invention is not limited thereto and the temperature table can be generated based on three or more critical code signals.

What is claimed is:

1. An image sensing device comprising:
    a pixel array block comprising a plurality of pixels for generating a plurality of analog pixel signals;
    a signal conversion block suitable for converting the plurality of analog pixel signals into a plurality of digital pixel signals;
    a first code processing block suitable for generating a first critical code corresponding to a first digital signal generated at a first temperature, and a second critical code corresponding to a second digital signal generated at a second temperature different from the first temperature, among the plurality of digital pixel signals during a first operation mode, and generating a target code signal reflecting current temperature information in response to the plurality of digital pixel signals during a second operation mode;
    a second code processing block suitable for generating a temperature table containing a reference code signal for temperature based on the first and second critical code signals;
    a temperature estimation block suitable for estimating a current temperature corresponding to the target code signal based on the temperature table; and
    a calibration block suitable for removing noise reflected in the analog pixel signals or the digital pixel signals at the current temperature based on an estimation result of the temperature estimation block.

2. The image sensing device of claim 1, wherein the plurality of pixels comprise active pixels and optical black pixels.

3. The image sensing device of claim 2, wherein the first code processing block comprises:
    an extraction unit suitable for extracting digital pixel signals corresponding to the optical black pixels among the plurality of digital pixel signals during the first and second operation modes; and
    an average calculation unit suitable for calculating an average of extracted pixel signals outputted from the extraction unit and generating the first and second critical code signals and the target code signal corresponding to the average of the extracted pixel signals during the first and second operation modes, respectively.

4. The image sensing device of claim 3, wherein the second code processing block comprises:
    a first storage unit suitable for storing the first and second critical code signals;
    a temperature table generation unit suitable for generating the temperature table based on the first and second critical code signals stored in the first storage unit; and
    a second storage unit suitable for storing the temperature table.

5. The image sensing device of claim 2, wherein the temperature estimation block generates a temperature code signal corresponding to the current temperature and outputs the generated temperature code signal to the calibration block, during an initial operation period and a blank period between readout periods of the second operation mode.

6. The image sensing device of claim 5, wherein the temperature estimation block comprises:
    a third storage unit suitable for storing the temperature code signal,
    and wherein the temperature estimation block updates the temperature code signal in the third storage unit at each blank period.

7. The image sensing device of claim 1, wherein:
    the pixel array block generates the analog pixel signals under the same first readout conditions during the first and second operation modes; and
    the signal conversion block generates the digital pixel signals under the same second readout conditions during the first and second operation modes.

8. The image sensing device of claim 7, wherein:
    the first readout conditions comprises an exposure time condition; and
    the second readout conditions comprises a gain condition.

9. A method for driving an image sensing device, comprising:
- generating a first critical code signal corresponding to a first digital pixel signal corresponding to an analog pixel signal and generated based on predetermined readout conditions at a first temperature, generating a second critical code signal corresponding to a second digital pixel signal corresponding to the analog pixel signal and generated based on the predetermined readout conditions at a second temperature different from the first temperature, and generating a temperature table containing a reference code signal for temperature based on the first and second critical code signals, during a test mode;
- generating a third digital pixel signal corresponding to the analog pixel signal based on the readout conditions, and estimating a current temperature based on the third digital pixel signal and the temperature table, during a normal operation mode; and
- removing noise reflected in the analog pixel signal or the third digital pixel signal based on the estimated current temperature, during the normal operation mode.

10. The method of claim 9, wherein the generating of the third digital pixel signal and the estimating of the current temperature comprises:
- generating the third digital pixel signal based on the readout conditions at the current temperature;
- generating a target code signal in response to the third digital pixel signal generated at the current temperature; and
- estimating the current temperature corresponding to the target code signal based on the temperature table.

11. The method of claim 9, wherein the removing of the noise comprises:
- controlling a current source coupled to an output terminal of the analog pixel signal.

12. The method of claim 9, wherein the removing of the noise comprises:
- controlling a current source coupled to an output terminal of the third digital pixel signal.

13. The method of claim 9, wherein the readout conditions comprises an exposure time condition and a gain condition.

14. The method of claim 9, wherein:
- the normal operation mode comprises a period in which the image sensing device performs a stable operation: and
- the normal operation mode comprises a pre-normal period, a readout period, and a blank period.

15. The method of claim 14, wherein the estimating of the current temperature and the removing of the noise are performed during the pre-normal period and the blank period.

16. The method of claim 9, wherein the first temperature includes a room temperature and the second temperature includes a high temperature higher than the room temperature, and the temperature table is generated in a range of the room temperature and the high temperature.

17. A method for driving an image sensing device, comprising:
- generating a digital pixel signal corresponding to an analog pixel signal based on a predetermined temperature condition and a predetermined readout conditions and generating a temperature table containing a reference code signal for temperature based on the digital pixel signal, during a test mode;
- generating the digital pixel signal corresponding to the analog pixel signal based on the readout conditions, and estimating a current temperature based on the digital pixel signal and the temperature table, during a normal operation mode; and
- removing noise reflected in the analog pixel signal or the digital pixel signal based on the estimated current temperature, during the normal operation mode,
- wherein the generating of the digital pixel signal and the temperature table comprises:
  - generating a first digital pixel signal based on the readout conditions at a first temperature;
  - generating a first critical code signal in response to the first digital pixel signal generated at the first temperature;
  - generating a second digital pixel signal based on the readout conditions at a second temperature different from the first temperature;
  - generating the second critical code signal in response to the second digital pixel signal generated at the second temperature; and
  - generating the temperature table based on the first critical code signal and the second critical code signal.

* * * * *